Dec. 30, 1958  H. E. RAACK ET AL  2,866,562
APPARATUS FOR STACKING TILE
Filed March 14, 1956
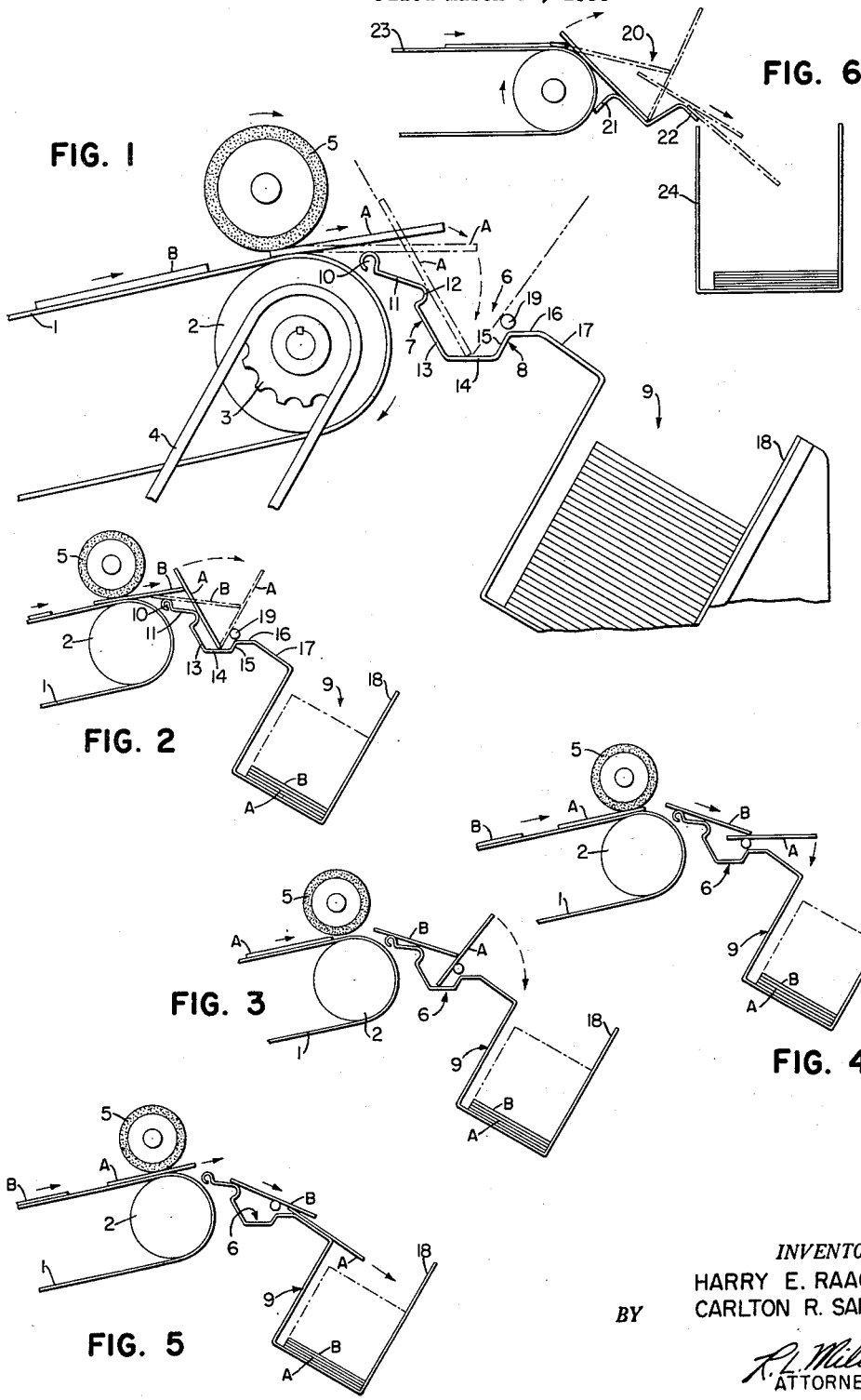
INVENTOR.
HARRY E. RAACK
CARLTON R. SARTORIS
BY
ATTORNEY

United States Patent Office 2,866,562
Patented Dec. 30, 1958

2,866,562

APPARATUS FOR STACKING TILE

Harry E. Raack, Akron, and Carlton Roy Sartoris, Copley, Ohio, assignors to The Goodyear Tire & Rubber Company, Akron, Ohio, a corporation of Ohio Application March 14, 1956, Serial No. 571,464

2 Claims. (Cl. 214—6)

This invention relates to a stacker mechanism and more particularly to a mechanism for stacking material such as floor tile in a face to face or back to back arrangement prior to subsequent operations thereon.

In manufacturing floor coverings of the various materials, it is essential that the face or finished surface of the covering be protected from contact with anything that might mar the surface. This does not present any problem in handling yard or roll flooring but in tile or block flooring, it is highly desirable to have the tile or block stacked in a face to face or back to back relation during processing and in the package of finished tile. The back of the tile block is usually of a relatively rough surface and under the weight of a stack of tile, the impression of the back will be formed in the finished surface of the adjacent tile if they are stacked with each tile facing the same direction.

One method of manufacturing block or tile is to form the tile from roll material by slitting the roll into strips of the approximate width of the tile then shearing the strips into block. Usually the block then are accurately sized by grinding, cutting, etc. either individually or in a stack. It is apparent that if the tile are stacked during the sizing operation, appreciable pressure would be necessarily applied to the stack to assure a good sizing job and such pressure would cause any irregularities on any of the surfaces to be imprinted in the opposing surface of the adjacent tile. The same result would occur in any package of stacked tile which is the usual manner of handling the tile either in processing or in boxing. It is essential that the finished surface of the tile be free from any such defects if a good, marketable product is to be had.

It is also evident that in any mass production process each individual tile will be faced in the same direction until specific steps are taken to change the positions as desired. Previously in many of the manufacturing processes, selective positioning of the tile has been done manually by an operator turning every other tile. This is not only a tedious, monotonous job but also expensive since the entire time of the operator is consumed by the job. It is therefore an object of this invention to provide an economical method and apparatus to stack objects such as flooring tile in the desired manner.

It is also an object of this invention to provide an apparatus that does not require accurate spacing of the tile along a path but will function perfectly with any spacing.

Another object of the invention is to provide a substantially fool-proof method that requires little if any observation.

A further object of the invention is to provide an apparatus that is readily adaptable to a variety of production apparatus now in use without undue alterations thereof.

Other objects and advantages of this invention will become apparent hereinafter as the description thereof proceeds, the novel features, arrangements, and combinations being clearly pointed out in the specification as well as the claims thereunto appended.

In the drawings:

Fig. 1 is an elevation of the apparatus of the invention;

Figs. 2–5 illustrate successive steps in the operation of the invention; and

Fig. 6 is an elevation of the modification of the invention.

In Fig. 1, a series of tile, two of which are represented as A and B on the surface of a conveyor belt, are moved continuously along a path by the conveyor belt 1. The tile are placed on the belt 1 in tandem arrangement with each tile in the same position, i. e. face up or face down. The spacing between adjacent tile need not be accurately controlled, the only requirement being that they do not overlap. For the purposes of describing the invention, it will be assumed that each tile is placed on the conveyor with the finished surface or face of the tile up although it is apparent the invention will function similarly if each tile was face down. One or more series of tile may be moved along the conveyor simultaneously depending upon the particular apparatus from which the tile are placed on the conveyor.

The belt 1 passes over a drive pulley 2 which is driven in the conventional manner, as shown, through sprocket 3 by chain 4 from a source of power not shown. Immediately above the belt 1 on the drive pulley 2, is a pressure roll 5 having a resilient cover engaging the upper surface of the tile as they are discharged from the conveyor 1.

Immediately adjacent the end and below the surface of the conveyor run, a generally trough shaped member 6 is mounted so as to extend substantially at right angles to the path of travel of the belt. The trough member 6 is basically V shaped (indicated by dotted lines in Fig. 1) with the legs 7 and 8 arranged to function as described later. Adjacent the trough member 6 on the side opposite the conveyor is a bin 9 or receptacle to receive the tile to form and hold a stack of tile as they are discharged from the conveyor through the trough member.

In the apparatus illustrated in Fig. 1, trough member 6 is formed of sheet material with a rolled, beaded edge 10 positioned close to conveyor belt and below the surface so as to engage the underside of the tile as it is discharged from the conveyor. This position is represented by the first dotted line position below tile A in Fig. 1. Depending angularly, downwardly and outwardly from the edge 10, portion 11 is formed with arcuate portion 12 on the end thereof. Portion 13 extends angularly and downwardly from the arcuate portion 12 in a more vertical direction than portion 11 to the bottom 14 of the trough member 6. The bottom 14 as shown, extends horizontally for a distance then the portion 15 extending upwardly and outwardly from the bottom 14 forms the other side of the trough 6. A substantially horizontally extending portion 16 joins portion 15 to the angularly extending way 17 adjacent one side of the stacking bin 9. The bin 9 is mounted so as to receive the tile as they slide off the way 17 and the outer side 18 of the bin extends above projected path of way 17 to limit the slide of the tile and cause the tile to fall down into the bin.

As illustrated, bar 19 is mounted parallel to the trough 6 above portion 15 to form a pivot for the tile to fall or gravitate over as they pass from the conveyor to the bin 9 for stacking. The bar 19 is placed below the center of the tile sufficiently so that the portion of the tile above the bar 19 will pivot the tile over the bar as will be explained later. If desired, the bar 19 may be adjustably mounted so that the position may be changed to accommodate different size tile. The bar 19 also serves as a means to more accurately control the movement of the tile.

In the modification of the invention shown in Fig. 6, the trough is a simple sheet metal V-shaped member 20 with turned over edge portions 21 and 22, the member 20 being positioned adjacent and below the end of the conveyor 23. A receptacle 24 is placed adjacent the member 20 to receive the tile as they are discharged from the member 20.

For the purpose of clarity, the operation of the invention will be described in connection with a succeeding pair of tile A and B in the series as they move along the path. The lead lines identifying the tile in each indicated position of the various views indicate the top face of the tile as it is positioned on the belt. In most applications of the invention, the top face will also be the finished surface of the tile.

In Fig. 1, tile A after it passes the pressure roll 5, falls down into the trough 6 with the leading edge thereof resting on the bottom of the trough and inclined away from normal toward the conveyor. This position is indicated by the dotted lines. A portion of tile A extends above the surface of the conveyor so that tile B will engage this portion as it moves over the path.

In Fig. 2, the leading edge of tile B contacts the under side or down face of the projecting portion of tile A as tile B moves under the pressure roll. The continuation of the movement of tile B tilts tile A over against the other side of the trough and the edge of tile B moves somewhat toward the bottom of the trough along the underface of tile A as indicated by the dotted lines. Tile A is inclined away from normal in this step in a direction opposite the previous inclined position.

In Fig. 3, tile A has started to pivot over the bar 19 and simultaneously raise the leading edge of tile B.

In Fig. 4, tile A has pivoted farther over the bar so that a portion of the lower face of tile A is almost in contact with the portion of the lower face of tile B.

In Fig. 5, tile A has completely pivoted over bar 19 and has gravitated onto way 17. Tile A then slides over the way until the edge contacts the side 18 of the bin. Simultaneously the lower face of tile B slides over the exposed lower face of tile A so that as tile A nears the side 18 of the bin, tile B is in substantial superposed relation to tile A. As tiles A and B clear the way 17 they drop into the receptacle 9.

The next tile following tile B along the conveyor then becomes another tile A in the sequence. The second tile following tile B then is another tile B in the sequence. The tiles along the conveyor are manipulated in pairs and it is apparent that each pair is deposited in the bin in a back to back relation. The next succeeding pair is deposited on the preceding pair so that the pairs that form the stack are in face to face relation. When the stack contains the required number of tile, it is removed from the bin.

The apparatus shown in Fig. 6 functions similarly to that shown in Figs. 1–5 inclusive by reversing the position of the faces of the first tile of any pair of tile as it passes along the conveyor. The detailed description of the apparatus shown in Figs. 1–5 inclusive is equally applicable to the modification of the invention shown in Fig. 6.

The nature of the particular type of tile that is being stacked by this invention will vary the positions of the tile as they pass through the stacking apparatus. If the tile is particularly flexible, the edge of tile B will tend to maintain its contact with the lower surface of tile A at the original point of contact through the steps shown in Fig. 2 so that a substantial portion of the lower faces of the tile will be superposed in relation throughout the stacking cycle. On the other hand, if the material is of a more rigid nature and relatively hard, the sequence of positions are substantially as shown in Figs. 2–5. These positions will vary even between tile made of comparable basic material due to the different compounding materials imparting slightly different degrees of stiffness and hardness to the tile. The apparatus as described by this invention satisfactorily stacks tile of the various materials such as rubber, vinyl, linoleum, cork, etc. by turning alternate tiles over from the position they originally were in on the conveyor. Slight adjustments in the position of the apparatus, particularly the bar 19, may be necessary to accommodate tile of each different material. Even so, the apparatus functions similarly with each of the materials.

While certain representative embodiments and details have been shown for the purpose of illustrating the invention, it will be apparent to those skilled in the art that various changes and modifications may be made therein without departing from the spirit or scope of the invention.

Having thus fully described our invention, what we claim and desire to secure by Letters Patent of the United States is:

1. In a conveying apparatus wherein a series of flooring tile are advanced along a given path each tile being of substantially uniform shape and size and having an upper and lower face with like faces facing in the same direction as they are advanced along the path, to a discharge position at which the tile are stacked, an improved stacking apparatus comprising a substantially V-shaped trough member adjacent to but below the discharge end of said path with the adjacent leg of the V in position to receive the lower surface of a tile as it is discharged with a portion of the tile projecting above the surface and inclined toward the path in a position to be engaged by the next successive tile as it advances toward discharge position to move said first mentioned tile on to the second leg of the V inclined away from the path, the second leg of the V being of a length to cause the first tile to pivot over the edge thereof as it is moved thereagainst by the next advancing tile, a way over which the first tile passes subsequently, the first engaging the next succeeding tile as it pivots to cause the first tile and next succeeding tile to pass over the way with like faces of the tiles in opposing relation; and a fixed receptacle positioned adjacent said second leg of the V of said trough to receive the pair of tiles whereby the pair and subsequent pairs of tile are stacked in said receptacle with like faces of adjacent tile in contact throughout the stack.

2. In a conveying apparatus wherein a series of flooring tile are advanced along a given path each tile being of substantially uniform shape and size and having an upper and lower face with like faces facing in the same direction as they are advanced along the path, to a discharge position at which the tile are stacked, an improved stacking apparatus comprising a substantially V-shaped trough member adjacent to but below the discharge end of said path, the trough being positioned at substantially right angles to the direction of the path with the adjacent leg of the V in position to receive the lower surface of a tile as it is discharged with a portion of the tile projecting above the surface and inclined toward the path in a position to be engaged by the next successive tile as it advances toward discharge position to move said first mentioned tile on to the second leg of the V inclined away from the path, the second leg of the V being of a length to cause the first tile to pivot over the edge thereof as it is moved thereagainst by the next advancing tile, a way over which the first tile passes subsequently, the first engaging the next succeeding tile as it pivots to cause the first tile and next succeeding tile to pass over the way with like faces of the tiles in opposing relation; and a fixed receptacle positioned adjacent said second leg of the V of said trough to receive the pair of tiles whereby the pair of tile and subsequent pairs of tile are stacked in said receptacle with like faces of adjacent tile in contact throughout the stack.

References Cited in the file of this patent

UNITED STATES PATENTS

| | | |
|---|---|---|
| 1,615,763 | Kaufman | Jan. 25, 1927 |
| 2,645,329 | Blair | July 14, 1953 |
| 2,675,930 | Youngfelt et al. | Apr. 20, 1954 |

FOREIGN PATENTS

| | | |
|---|---|---|
| 116,502 | Sweden | June 4, 1946 |
| 1,072,429 | France | Sept. 13, 1954 |